United States Patent
Bowles et al.

(10) Patent No.: US 6,535,797 B1
(45) Date of Patent: Mar. 18, 2003

(54) ELECTRICAL DISTRIBUTION SYSTEM AND METHOD OF MONITORING AND/OR CONTROLLING SAME

(75) Inventors: Scott D. Bowles, Fort Wayne, IN (US); Craig W. Trowbridge, Fort Wayne, IN (US); David L. Bowles, Leo, IN (US)

(73) Assignee: Spectrum Engineering Corporation, Leo, IN (US)

(*) Notice: Subject to any disclaimer, the term of this patent is extended or adjusted under 35 U.S.C. 154(b) by 0 days.

(21) Appl. No.: 09/495,846

(22) Filed: Feb. 1, 2000

(51) Int. Cl.[7] .............................................. G06K 15/00
(52) U.S. Cl. ........................ 700/286; 700/291; 700/292; 700/297
(58) Field of Search ................................ 700/286, 291, 700/292, 293, 295, 297; 340/870.02, 310, 150; 702/62; 709/200, 201, 203, 217, 218, 219

(56) References Cited

U.S. PATENT DOCUMENTS

| | | | |
|---|---|---|---|
| 3,702,460 A | * 11/1972 | Blose | 307/40 |
| 4,264,960 A | 4/1981 | Gurr | 364/492 |
| 4,302,750 A | 11/1981 | Wadhwani et al. | 340/870.02 |
| 4,804,938 A | 2/1989 | Rouse et al. | 340/310 |
| 5,179,376 A | * 1/1993 | Pomatto | 340/310.01 |
| 5,237,511 A | 8/1993 | Caird et al. | 364/483 |
| 5,469,365 A | * 11/1995 | Diekema et al. | 340/870.02 |
| 5,528,507 A | * 6/1996 | McNamara et al. | 340/870.02 |
| 5,553,094 A | 9/1996 | Johnson et al. | 375/200 |
| 5,568,399 A | 10/1996 | Sumic | 346/492 |
| 5,680,324 A | * 10/1997 | Schweitzer et al. | 340/870.02 |
| 5,684,710 A | 11/1997 | Ehlers et al. | 364/492 |
| 5,734,255 A | 3/1998 | Thompson et al. | 322/7 |
| 5,812,389 A | * 9/1998 | Katayama et al. | 700/2 |
| 5,818,725 A | * 10/1998 | McNamara et al. | 340/870.02 |
| 5,892,758 A | 4/1999 | Argyroudis | 370/335 |
| 5,933,355 A | * 8/1999 | Deb | 702/3 |
| 5,963,457 A | * 10/1999 | Kanoi et al. | 340/870.03 |
| 6,005,759 A | * 12/1999 | Hart et al. | 361/62 |

\* cited by examiner

Primary Examiner—Leo Picard
Assistant Examiner—Michael D. Masinick
(74) Attorney, Agent, or Firm—Taylor & Aust, P.C.

(57) ABSTRACT

An electrical distribution system includes a communications network; a transmission circuit; a plurality of distribution feeder circuits; at least one monitoring device; and a plurality of substations. Each monitoring device is associated with an operating parameter of the transmission circuit or one of the distribution feeder circuits. Each of the substations is electrically connected between the transmission circuit and at least one of the distribution feeder circuits. Each substation includes at least one controllable device and a control unit. The control unit at each substation includes a communications device and a processing circuit. The communications device is independently coupled with the communications network for providing data to and receiving data from the communications network. The processing circuit is coupled with the communications device and at least one monitoring device. The processing circuit at least intermittently receives an output signal from the monitoring device and at least intermittently transmits an output signal to the communications network via the communications device. The processing circuit is configured to control operation of at least one controllable device at the corresponding substation. Additionally, the processing circuit is configured to control operation of at least one controllable device at a remote substation.

23 Claims, 2 Drawing Sheets

ELECTRICAL DISTRIBUTION SYSTEM AND METHOD OF MONITORING AND/OR CONTROLLING SAME

BACKGROUND OF THE INVENTION

1. Field of the Invention

The present invention relates to an electrical distribution system for distributing electrical power, and, more particularly, to an electrical distribution system with remote monitoring and/or control of substations.

2. Description of the Related Art

An electrical distribution system typically includes a transmission circuit in the form of one or more transmission lines which carry high voltage electricity. A plurality of substations are connected with the transmission circuit and convert the high voltage electricity carried by the transmission circuit to lower voltage electricity which is transmitted over a distribution feeder circuit to the end users.

It is known to provide monitoring and control of substations using a Supervisory Control And Data Acquisition (SCADA) System. In general, a SCADA system includes a single control unit which monitors and controls operation of the number of substations in the electrical distribution system. Intelligent electronic devices (IED) such as a power outage monitor or automated meter transmit a signal via either hardwired or wireless communication links to the single control unit of the SCADA system. The single control unit can then determine whether a power outage condition has occurred, and control controllable devices within the substation accordingly. A problem with a SCADA system is that control only occurs through the single control unit and failure of the control unit renders the entire system inoperable.

It is also known to couple a SCADA system with a geographic information system (GIS) which provides information relating to specific types and placement locations of electronic devices within a geographic area. If the single control unit of the SCADA system determines that a power outage condition has occurred, the GIS data may be utilized by the SCADA control unit to determine the approximate location of a probable fault and/or to compile a list of electrical devices which may be needed to repair the fault.

It is additionally known to provide a customer information system (CIS) which receives information from the control unit of the SCADA system pertaining to, e.g., a possible outage area or location, and allows customers to access such information.

Although SCADA systems as described above are generally acceptable for monitoring and/or controlling electrical power within an electrical distribution system, they do have certain problems. For example, if the single control unit of the SCADA system becomes inoperable, monitoring and/or control of the substations within the electrical distribution system from a remote location is impossible. Additionally, if a power outage occurs within a distribution feeder circuit, an electrical device such as a fuse, breaker, etc. may be identified which caused the problem, but the exact operating conditions both before and after the power outage condition remain unknown. Moreover, traditional SCADA systems generally are reactive systems in that they determine that a power outage condition has already occurred. They do not proactively consider such factors as weather related factors which may affect the transmission capacity of a transmission line and/or distribution feeder circuit which could result in an overload condition and cause a power outage condition.

SUMMARY OF THE INVENTION

The present invention provides an electrical distribution system and corresponding method of distributing electrical power, wherein a plurality of substations include processing circuits which are connected to each other and to monitoring devices and intelligent electronic devices with an open architecture such that operation at any particular substation may be monitored and/or controlled at any substation within the electrical distribution system.

The invention comprises, in one form thereof, an electrical distribution system including a communications network; a transmission circuit; a plurality of distribution feeder circuits; at least one monitoring device; and a plurality of substations. Each monitoring device is associated with an operating parameter of the transmission circuit or one of the distribution feeder circuits. Each of the substations is electrically connected between the transmission circuit and at least one of the distribution feeder circuits. Each substation includes at least one controllable device and a control unit. The control unit at each substation includes a communications device and a processing circuit. The communications device is independently coupled with the communications network for providing data to and receiving data from the communications network. The processing circuit is coupled with the communications device and at least one monitoring device. The processing circuit at least intermittently receives an output signal from the monitoring device and at least intermittently transmits an output signal to the communications network via the communications device. The processing circuit is configured to control operation of at least one controllable device at the corresponding substation. Additionally, the processing circuit is configured to control operation of at least one controllable device at a remote substation.

An advantage of the present invention is that the control units at each substation are coupled with each other with an open architecture such that operation at any substation may be monitored and/or controlled at any other substation.

Another advantage is that operation of a particular distribution feeder circuit may be monitored and/or controlled at a remote substation, even if the local substation fails.

Yet another advantage is that the control unit may be coupled with a weather station to receive data corresponding to a transmission capacity of an associated distribution feeder circuit.

A still further advantage is that each of the control units may be coupled with a geographic information system which provides data pertinent to specific types of electronic devices within a corresponding geographic area and/or specific locations of electronic devices within the geographic area.

A still further advantage is that each control unit may be coupled with a customer information system allowing customers to directly access information pertaining to electrical power distribution in their area, such as the status of a power outage condition and/or rate information.

An additional advantage is that each control unit may be provided with a graphical user interface which graphically illustrates to a user certain parameters associated with the electrical distribution system, such as the location of a cause of a power outage condition; the location of at least one controllable device within a distribution feeder circuit; and/or a graphical illustration of specific electrical devices within a particular distribution feeder circuit and/or transmission circuit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
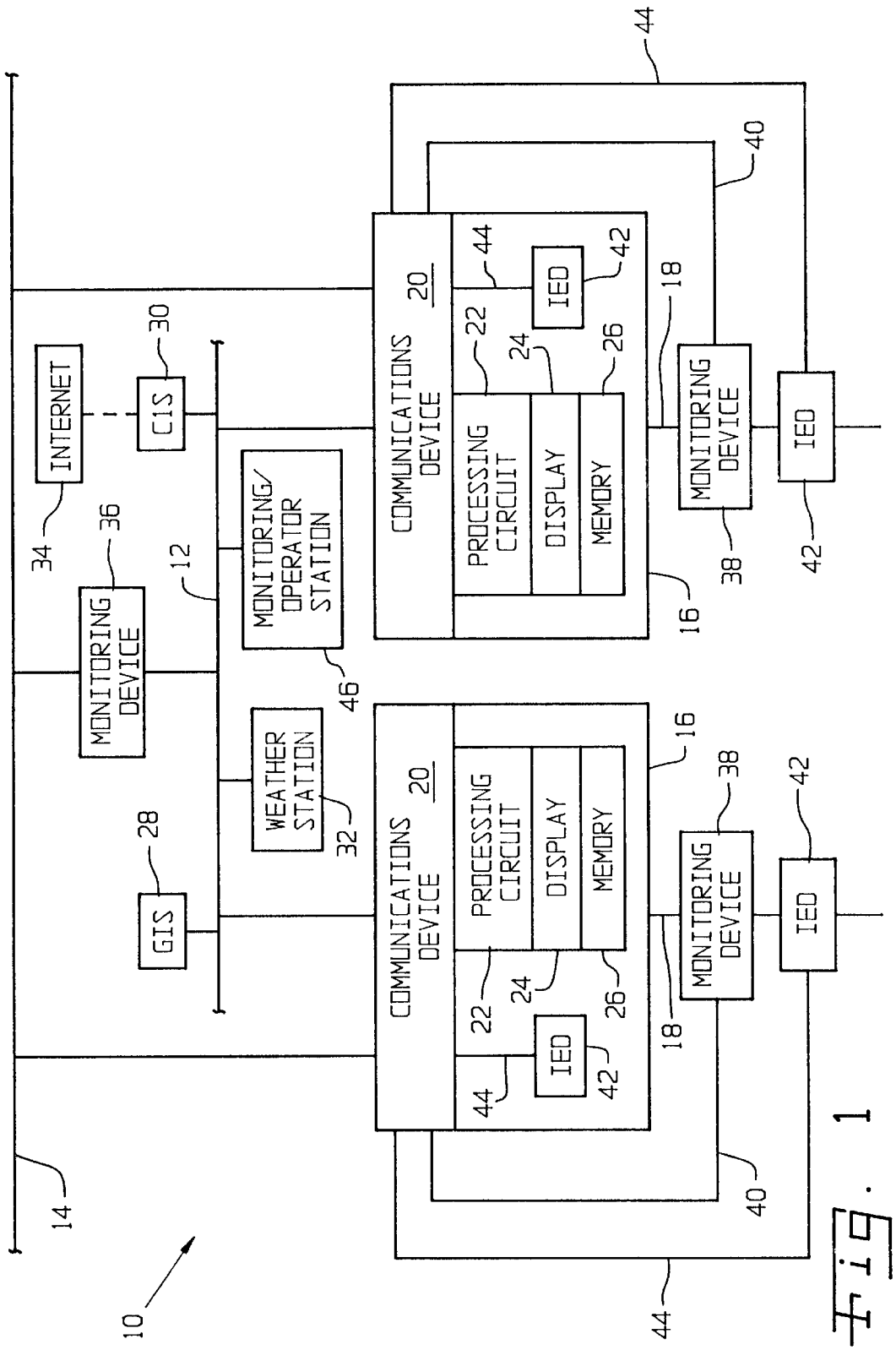
FIG. 1 is a simplified, schematic illustration of an embodiment of an electrical distribution system of the present invention.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Referring now to the drawings, and more particularly to FIG. 1, there is shown a simplified schematic illustration of an embodiment of an electrical distribution system 10 of the present invention. Electrical distribution system 10 generally includes a communications network 12; a transmission circuit 14; a plurality of substations 16; and a plurality of distribution feeder circuits 18.

Transmission circuit 14 transmits high voltage electricity from a source of electricity to the plurality of substations 16. Transmission circuit 14 is shown as a single transmission line in the embodiment shown in FIG. 1 for purposes of simplicity, but likely is constructed with multiple lines for purposes of redundancy and reliability.

Communications network 12 is used to transmit data to and from various electrical devices within electrical distribution system 10, as will be described in more detail hereinafter. Communications network 12 may be, e.g., a wide area network or other suitable communications media.

Each substations 16 is electrically connected between transmission circuit 14 and at least one distribution feeder circuit 18. In the embodiment shown, each substation 16 is electrically connected between transmission circuit 14 and a single distribution feeder circuit 18. Each substation 16 functions to convert high voltage electricity received from transmission circuit 14 to a lower voltage electricity which is transmitted over an associated distribution feeder circuit 18 to a plurality of electrical loads at end user locations.

Distribution feeder circuits 18 transmit lower voltage electricity to end user locations, as described above. In the embodiment shown, each distribution feeder circuit 18 is shown for simplicity sake as a single distribution feeder line. However, in reality each distribution feeder circuit 18 likely consists of a plurality of electrical lines which provide lower voltage electricity to end users.

Each substation 16 is also configured to receive, process and transmit data corresponding to operating parameters associated with transmission circuit 14 and/or one or more distribution feeder circuits 18. More particularly, each substation 16 includes a communications device 20, a processing circuit 22, a graphical display 24 and a memory 26. Communications device 20 of each substation 16 is independently coupled with communications network 12. Communications device 20 is configured to receive and transmit data, recognize a particular data type of data received, translate data if necessary from one data type to another, and transmit the data of a particular data type to communications network 12.

For example, a Geographic Information System (GIS) 28, Customer Information System (CIS) 30, and weather station 32 are all connected to communications network 12 in the embodiment shown. GIS 28 provides data to communications network 12 relating to specific system configuration data associated with a geographic region of electrical distribution system 10. For example, GIS 28 may provide data to communications network 12 relating to locations of controllable devices associated with one or more substations 16; and/or specific types of controllable devices associated with one or more substations 16.

CIS 30 is coupled with communications network 12 and provides data to customers which may be of interest or value. For example, CIS 30 may provide data to communications network 12 relating to a status of a power outage condition within electrical distribution system 10; and/or rate information associated with all or part of electrical distribution system 10. CIS 30 includes an internal modem which is connected via a dial-up connection to internet 34 which may be accessed by customers to obtain pertinent data relative to electrical distribution system 10. In the embodiment described with reference to FIG. 1, CIS 30 is coupled with internet 34. However, it is also possible to couple GIS 28 and/or weather station 32 with internet 34.

Weather station 32 is coupled with and provides data to communications network 12 relating to atmospheric conditions which may affect operation of electrical distribution system 10. For example, weather station 32 may provide data to communications network 12 relating to ambient temperatures; wind speed; wind direction; relative humidity; barometric pressure; solar radiation; and/or precipitation. Such atmospheric conditions may affect operating parameters associated with electrical distribution system 10, such as, e.g., the transmission capacity of electrical distribution system 10 over transmission circuit 14 and/or distribution feeder circuits 18.

A plurality of monitoring devices 36 and 38 may also be coupled with and provide data to communications device 20 at each substation 16. Monitoring device 36 is coupled with each communications device 20 via communications network 12, while monitoring devices 38 are directly coupled with an associated communication device 20 via line 40. Monitoring devices 36 and 38 each monitor one or more operating parameters associated with transmission circuit 14 and/or an associated distribution feeder circuit 18. For example, each monitoring device 36 or 38 may monitor a power outage condition which occurs within electrical distribution system 10 and provide one or more data signals to one or more communication devices 20. Monitoring devices 36 and/or 38 may monitor other operating parameters, such as an overload condition, etc. and provide data signals to one or more communication devices 20 indicative of the same.

Regardless of the particular types of electrical devices which are coupled with each communication device 20 at each substation 16, each communication device 20 is configured to seemlessly integrate the various electrical devices, regardless of the particular data format which is transmitted either directly or via communications network 12 to communications device 20.

As is apparent from FIG. 1, each communications device 20 is coupled in an independent, parallel manner with communications network 12. Thus, failure of one substation 16 will not effect data communications over communications network 12, and other substations 16 may still effectively communicate with each other.

Each substation 16 may also include a plurality of controllable devices in the form of Intelligent Electronic Devices (IED) 42 which are coupled with a respective communications device 20. Each IED 42 may be configured as, e.g., a circuit breaker; a capacitor bank; a relay; or a switch which is controllably actuated using data transmitted to and from communications device 20 via line 44.

In the embodiment shown in FIG. 1, monitoring devices 38 are shown as discrete elements from IED 42. However, it is also possible for monitoring devices 36 and 38 to be configured as intelligent electronic devices which are controllably actuated. For example, each monitoring device 38 may be configured as a power outage monitor or a meter which may be controllably actuated. Moreover, monitoring devices 36 and 38 as well as IED 42 are shown as being hardwired to communications device 20. However, it is also possible to transmit and receive data via a wireless link, in known manner. Moreover, monitoring devices 38 and IED 42 may be configured as discrete devices as shown; or may be configured as integral devices providing multiple functionality.

Memory 26 within each substation 16 is configured as a non-volatile memory with sufficient capacity to store a plurality of output signals received from various electrical devices within electrical distribution system 10, either directly or via communications network 12. A plurality of data signals are preferably time stamped using conventional timing circuitry within processing circuit 22 so that an event such as a power outage condition may be recreated by retrieving data stored before and after the power outage condition occurred.

Processing circuit 22 intermittently or continuously receives output signals from monitoring devices 36 and/or 38; and continuously or intermittently transmits output signals to communications network 12 via communications device 20. Processing circuit 22 is configured to control operation of at least one controllable device 42 at the same substations 16, and is also configured to control operation of at least one controllable device 42 at another substations 16. More particularly, each processing circuit 22 receives input data from monitoring devices 36 and/or 38 as described above. In addition, each processing circuit 22 is coupled with and controllably actuates one or more controllable devices in the form of IED(s) 42. Each processing circuit 22 may controllably actuate an IED 42 at the same substation 16 by transmitting a control signal over an associated line 44; or may remotely control operation of an IED 42 at a remote substation by transmitting a control signal first to communications network 12 and then to the particular line 44 which is coupled with the IED 42 to be controlled. Processing circuit 22 may also receive data from GIS 28 and/or weather station 32. Processing circuit 22 may controllably actuate an IED 42 at the same or a remote substation 16, dependent upon the data signals received from GIS 28 and/or weather station 32.

Each substation 16 also includes a display 24 which is coupled with processing circuit 22. Display 24 acts as a graphical user interface to display graphical information which may be of interest to an operator at the local substation 16. For example, display 24 can be used to display the location of a cause of a power outage condition; the location of at least one controllable device within the same or remote distribution feeder circuit and/or the appearance of actual electrical devices within the same distribution feeder circuit. In the event a power outage condition is displayed, processing circuit 22 may obtain data from GIS 28 and display a graphical representation of a likely cause for a power outage condition within electrical distribution system 10. Information from GIS 28 may also be used to display the location of at least one controllable device within a distribution feeder circuit. In the event a graphical illustration of an actual electrical device (such as a switch, circuit breaker, etc.) is illustrated, display 28 displays a preconfigured picture of the typical electrical device to be displayed. For example, display 24 may display a picture of a circuit breaker which is to be tagged out by a technician. Display 24 may also graphically illustrate a tag which is to be used to tag out the circuit breaker. Processing circuit 22 may also be coupled with a printer (not shown) for printing out the tag which is to be used to tag out the circuit breaker.

Processing circuit 22 may also be utilized to determine a transmission capacity of transmission circuit 14 and/or an associated distribution feeder circuit 18 utilizing data signals received over communications network 12 from weather station 32. Data related to the atmospheric environment such as ambient temperature, wind speed, wind direction, relative humidity, barometric pressure, solar radiation and/or precipitation may affect the transmission capacity of electrical lines associated with transmission circuit 14 and/or distribution feeder circuit 18. Processing circuit 22 may utilize data from weather station 32 to calculate when a transmission capacity of transmission circuit 14 and/or distribution feeder circuit 18 is being approached or has been exceeded, and can output an alarm signal and/or control operation of an IED 42.

Electrical distribution system 10 also optionally includes a monitoring/operator station 46 which is coupled with communications network 12. Monitoring/operator station 46 does not function to convert a higher voltage electricity to a lower voltage electricity as do substations 16. Rather, monitoring/operator station 46 only functions to allow monitoring and/or control of operating parameters and various controllable devices at the different substations 16.

During use, high voltage electricity is transmitted over transmission circuit 14 to each substation 16. Each substation 16 converts the high voltage electricity to a lower voltage electricity which is transmitted over a distribution feeder circuit 18 to electrical loads at consumer locations. Concurrently, monitoring devices 36 and 38 monitor one or more operating parameters associated with transmission circuit 14 and/or distribution feeder circuit 18. Monitoring devices 36 and 38 output signals to communications device 20 at one or more substations 16. The signals received at communications device 20 can either be retransmitted to communications network 12, or may be utilized by an associated processing circuit 22. Alternatively, the signals may be passed to communications network 12 in a parallel manner so that remote monitoring may occur even upon failure of a substation 16. The output signals are time stamped and stored in memory 26. Processing circuit 22 controls one or more IED's 42 by transmitting an output signal over a corresponding line 44. Control of IED 42 may be dependent upon user input, signals received from monitoring devices 36 and/or 38, and/or data signals received from GIS 28 or weather station 32.

Figure 2:
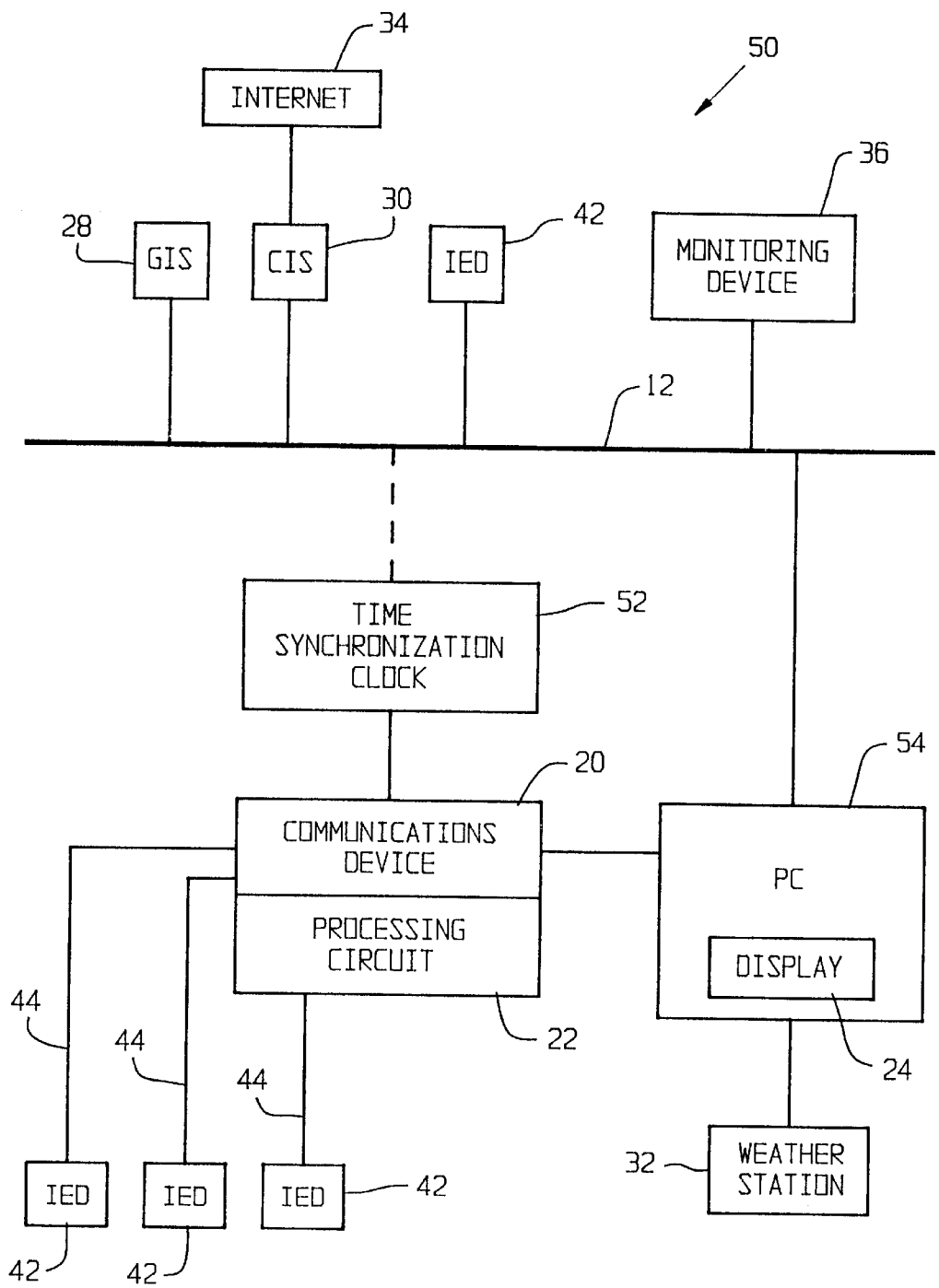
FIG. 2 is a simplified, schematic illustration of another embodiment of an electrical distribution system of the present invention.

Referring now to FIG. 2, there is shown another embodiment of an electrical distribution system 50 of the present invention. The schematic representation of FIG. 2 only illustrates the data connections between various devices within electrical distribution system 50, and does not represent the electrical power distribution interconnections of electrical distribution system 50. Electrical distribution system 50 includes GIS 28, CIS 30, internet 34, monitoring device 36, IED's 42, communications device 20, processing circuit 22 and weather station 32, similar to the embodiment of electrical distribution system 10 shown in FIG. 1, and coupled with each other as shown. Additionally, electrical distribution system 50 includes a time synchronization clock 52 and a personal computer (PC) 54. Time synchronization clock 52 outputs a signal to communications device 20, and also optionally outputs a signal directly to communications network 12 for synchronization of electrical components connected with communications network 12 at other remote substations. By providing time synchronization between the different substations, the actual time of an occurrence of interest, such as a power outage condition, can be accurately determined.

PC 54 is coupled with processing circuit 22, weather station 32 and communications network 12. PC 54 includes display 24, which graphically displays information to an operator, as described above with reference to electrical distribution system 10 shown in FIG. 1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical distribution system, comprising:
    a communications network;
    a weather station coupled with said communications network, said weather station providing data to said communications network relating to at least one of:
        ambient temperature;
        wind speed;
        wind direction;
        relative humidity;
        barometric pressure;
        solar radiation; and
        precipitation;
    a transmission circuit;
    a plurality of distribution feeder circuits;
    at least one monitoring device, each said monitoring device associated with an operating parameter of one of said transmission circuit and one of said distribution feeder circuits; and
    a plurality of substations, each said substation being electrically connected between said transmission circuit and at least one of said distribution feeder circuits, each said substation including at least one controllable device and a control unit, said control unit including:
        a communications device independently coupled with said communications network for providing data to and receiving data from said communications network; and
        a processing circuit coupled with said communications device and at least one said monitoring device, said processing circuit at least intermittently receiving an output signal from said at least one monitoring device and at least intermittently transmitting an output signal to said communications network via said communications device, said processing circuit being configured to control operation of at least one said controllable device at said corresponding substation, and to control operation of at least one said controllable device at another said substation, said processing circuit being utilizing said data from said weather station to calculate a transmission capacity of at least one of said transmission circuit and said plurality of distribution feeder circuits.

2. The electrical distribution system of claim 1, wherein said processing circuit is configured to output an alarm signal when a transmission capacity of said associated distribution feeder circuit is exceeded.

3. The electrical distribution system of claim 2, wherein said processing circuit is configured to control operation of at least one said controllable device at said corresponding substation or said another substation dependent upon said data from said weather station.

4. The electrical distribution system of claim 1, further comprising a geographic information system coupled with said communications network, said geographic information system providing data to said communications network relating to at least one of:
    locations of said controllable devices associated with at least one said substation; and
    specific types of said controllable devices associated with at least one said substation.

5. The electrical distribution system of claim 1, further comprising a customer information system coupled with said communications network, said customer information system providing data to said communications network relating to at least one of:
    status of a power outage condition; and
    rate information.

6. The electrical distribution system of claim 5, further comprising a customer interface providing access to said data from said customer information system.

7. The electrical distribution system of claim 6, wherein said customer interface comprises a modem connected to a global computer network.

8. The electrical distribution system of claim 1, wherein at least one said monitoring device at each said substation is configured to detect a fault condition and provide a fault output signal to said communications network, and wherein each said processing circuit is configured to determine an approximate fault location using said fault output signal.

9. The electrical distribution system of claim 1, wherein each said control unit further comprises a graphical user interface.

10. The electrical distribution system of claim 9, wherein said processing circuit displays graphical information on said graphical user interface corresponding to at least one of:
    location of a cause of a power outage condition;
    location of at least one controllable device within at least one said distribution feeder circuit; and
    graphical illustration of other electrical devices within at least one said distribution feeder circuit.

11. The electrical distribution system of claim 1, wherein at least one said monitoring device comprises an intelligent electronic device.

12. The electrical distribution system of claim 11, wherein said intelligent electronic device comprises one of a power outage monitor and a meter.

13. The electrical distribution system of claim 1, wherein each said controllable device comprises one of:
   a circuit breaker;
   a capacitor bank;
   a relay; and
   a switch.

14. The electrical distribution system of claim 1, wherein each said monitoring device outputs a plurality of signals to said communications network, and wherein each said control unit comprises a long term memory for storing said plurality of signals.

15. The electrical distribution system of claim 14, wherein said plurality of signals stored in said long term memory are time stamped.

16. The electrical distribution system of claim 1, wherein said communications network comprises a wide area network.

17. A utility supply system, comprising:
   a communications network;
   a utility supply circuit;
   a plurality of distribution feeder circuits;
   at least one monitoring device, each said monitoring device associated with an operating parameter of one of said utility supply circuit and one of said distribution feeder circuits;
   a plurality of remote stations, each said remote station being electrically connected between said utility supply circuit and at least one of said distribution feeder circuits, each said remote station including at least one controllable device and a control unit, said control unit including:
      a communications device independently coupled with said communications network for providing data to and receiving data from said communications network; and
      a processing circuit coupled with said communications device and at least one said monitoring device, said processing circuit at least intermittently receiving an output signal from said at least one monitoring device and at least intermittently transmitting an output signal to said communications network via said communications device, said processing circuit being configured to control operation of at least one said controllable device at said corresponding remote station, and to control operation of at least one said controllable device at another said remote station;
   a geographic information system coupled with said communications network, said geographic information system providing data to said communications network relating to at least one of:
      locations of said controllable devices associated with at least one said remote station; and
      specific types of said controllable devices associated with at least one said remote station; and
   a customer information system coupled with said communications network, said customer information system providing data to said communications network relating to at least one of:
      status of a power outage condition; and
      rate information;
   said customer information system being coupled to the internet providing thereto graphical indications of geographical regions of the utility supply system from said geographic information system and operational status of the utility supply system.

18. The utility supply system of claim 17, wherein said utility supply system comprises an electrical distribution system, said utility supply circuit comprises an electrical transmission circuit, and each said remote station comprises a remote substation.

19. A method of distributing electrical power in an electrical distribution system, said method comprising the steps of:
   providing a communications network;
   coupling a weather station with said communications network, said weather station providing data to said communications network relating to at least one of: ambient temperature; wind speed; wind direction; relative humidity; barometric pressure; solar radiation; and precipitation;
   providing a transmission circuit and a plurality of distribution feeder circuits;
   monitoring an operating parameter with at least one monitoring device, each said monitoring device being associated with one of said transmission circuit and one of said distribution feeder circuits;
   electrically connecting a first substation and a second substation between said transmission circuit and a respective said distribution feeder circuit, said first substation and said second substation each including at least one controllable device and a control unit, said control unit including:
      a communications device independently coupled with said communications network for providing data to and receiving data from said communications network; and
      a processing circuit coupled with said communications device and at least one said monitoring device;
   at least intermittently receiving an output signal at said processing circuit at said first substation from at least one said monitoring device;
   at least intermittently transmitting an output signal from said processing circuit at said first substation to said communications network via said corresponding communications device;
   controlling operation of at least one said controllable device at said first substation using said processing circuit at said first substation;
   controlling operation of at least one said controllable device at said second substation using said processing circuit at said first substations;
   determining a transmission capacity of at least one of said transmission circuit and at least one of said distribution feeder circuits using one said processing circuit and said data from said weather station; and
   outputting an alarm signal when said transmission capacity is exceeded.

20. The method of claim 19, further including the step of coupling a geographic information system with said communications network, said geographic information system providing data to said communications network relating to at least one of:
   locations of said controllable devices associated with at least one said substation; and
   specific types of said controllable devices associated with at least one said substation.

21. The method of claim 19, including the further steps of:
   coupling a customer information system with said communications network, said customer information system providing data to said communications network relating to at least one of status of a power outage condition, and rate information; and accessing said data from said customer information system using a customer interface.

22. The method of claim 19, including the further steps of:

outputting a fault output signal corresponding to a fault condition in at least one said distribution feeder circuit to said communications network from at least one said monitoring device; and determining an approximate fault location using said processing circuit at said first substation dependent upon said fault output signal.

23. The method of claim 19, including the further steps of:

providing a graphical user interface; and displaying graphical information on said graphical user interface corresponding to at least one of:
   location of a cause of a power outage condition;
   location of at least one controllable device within at least one said distribution feeder circuit; and
   graphical illustration of other electrical devices within at least one said distribution feeder circuit.

* * * * *